US008803863B2

(12) United States Patent
Chen (10) Patent No.: US 8,803,863 B2
(45) Date of Patent: Aug. 12, 2014

(54) DISPLAY POWER SAVING METHOD AND ELECTRONIC SYSTEM

(75) Inventor: Shao-Fong Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 287 days.

(21) Appl. No.: 13/157,314

(22) Filed: Jun. 10, 2011

(65) Prior Publication Data

US 2011/0304536 A1    Dec. 15, 2011

(30) Foreign Application Priority Data

Jun. 11, 2010  (TW) ............................. 99119082 A (51) Int. Cl.
*G09G 5/00* (2006.01)
*G09G 3/36* (2006.01)
*G09G 5/10* (2006.01)
*G06F 1/32* (2006.01)

(52) U.S. Cl.
CPC ............... *G06F 1/3203* (2013.01); *Y02B 60/32* (2013.01); *G06F 1/3265* (2013.01); *Y02B 60/1242* (2013.01)
USPC ............. 345/211; 345/102; 345/690; 700/22; 713/320; 715/856; 715/781

(58) Field of Classification Search
USPC .................... 700/300, 22; 345/102, 211, 690; 713/320
See application file for complete search history.

(56) References Cited

U.S. PATENT DOCUMENTS 6,801,811 B2 * 10/2004 Ranganathan et al. ......... 700/22
8,339,429 B2 * 12/2012 Canu et al. .................... 345/698
2003/0146897 A1    8/2003 Hunter
2005/0270283 A1 * 12/2005 Plut ............................... 345/211
2006/0087502 A1 *  4/2006 Karidis et al. ................ 345/211
2008/0068359 A1 *  3/2008 Yoshida et al. ............... 345/204
2009/0172422 A1 *  7/2009 Campesi et al. .............. 713/300
2009/0303170 A1   12/2009 Chung
2010/0103089 A1    4/2010 Yoshida
2011/0216083 A1 *  9/2011 McRae ......................... 345/589

FOREIGN PATENT DOCUMENTS

CN    101604513 A   12/2009
CN    101727835 A    6/2010

OTHER PUBLICATIONS

Office action mailed on Mar. 28, 2013 for the China application No. 201010205185.1, p. 3 line 4~40, p. 4 and p. 5 line 1~18.
Office action mailed on Oct. 29, 2013 for the China application No. 201010205185.1, p. 3 line 5~42, pp. 4~5 and p. 6 line 2~4.
Office action mailed on Jun. 27, 2013 for the Taiwan application No. 099119082, filing date: Jun. 11, 2010, p. 1 line 12~14, pp. 2~4 and p. 5 line 1~12.

* cited by examiner

*Primary Examiner* — Lun-Yi Lao
*Assistant Examiner* — Ibrahim Khan
(74) *Attorney, Agent, or Firm* — Winston Hsu; Scott Margo (57) ABSTRACT

A display power saving method for an electronic system includes a display including a light emitting diode panel. The display power saving method comprises detecting whether a pointing device exists in the electronic system, obtaining the location of a pointer controlled by the pointing device when detecting the pointing device existing in the electronic system, determining a display area of a screen of the display according to the location of the pointer, recognizing whether a power management mode of the electronic system is a power saving mode and decreasing the brightness of an area of the screen other than the display area when recognizing that the power management mode is the power saving mode.

22 Claims, 11 Drawing Sheets

FIG. 6 a chair of each Advisory Committee, whose term as chair shall be for 3 years.

(3) TIMING OF APPOINTMENTS.— Initial appointments to each Advisory Committee shall be made within 3 months after the effective date of the Patent and Trademark Office Efficiency Act. Vacancies shall be filled within 3 months after they occur.

(b) BASIS FOR APPOINTMENTS.— Members of each Advisory Committee—

(1) shall be citizens of the United States who shall be chosen so as to represent the interests of diverse users of the United States Patent and Trademark Office with respect to patents, in the case of the Patent Public Advisory Committee, and with respect to trademarks, in the case of the Trademark Public Advisory Committee;

(2) shall include members who represent small and large entity applicants located in the United States in proportion to the number of applications filed by such applicants, but in no case shall members who represent small entity patent applicants, including small business concerns, independent inventors, and nonprofit organizations, constitute less than 25 percent of the members of the Patent Public Advisory Committee, and such members shall include at least one independent inventor; and (3) shall include individuals with substantial background and achievement in finance, management, labor relations, science, technology, and office automation. In addition to the voting members, each Advisory Committee shall include a representative of year—

(A) prepare an annual report on the matters referred to in paragraph (1);

(B) transmit the report to the Secretary of Commerce, the President, and the Committees on the Judiciary of the Senate and the House of Representatives; and (C) publish the report in the Official Gazette of the United States Patent and Trademark Office.

(e) COMPENSATION.— Each member of each Advisory Committee shall be compensated for each day (including travel time) during which such member is attending meetings or conferences of that Advisory Committee or otherwise engaged in the business of that Advisory Committee, at the rate which is the daily equivalent of the annual rate of basic pay in effect for level III of the Executive Schedule under section 5314 of title 5. While away from such member's home or regular place of business such member shall be allowed travel expenses, including per diem in lieu of subsistence, as authorized by section 5703 of title 5.

(f) ACCESS TO INFORMATION.— Members of each Advisory Committee shall be provided access to records and information in the United States Patent and Trademark Office, except for personnel or other privileged information and information concerning patent applications required to be kept in confidence by section 122.

DISPLAY POWER SAVING METHOD AND ELECTRONIC SYSTEM

BACKGROUND OF THE INVENTION

1. Field of the Invention

The present invention relates to a display power saving method and related electronic system, more particularly, to a display power saving method for adjusting the brightness of a screen of a display for an electronic system by sections according to whether a pointing device exists in the electronic system and the power management mode of the electronic system.

2. Description of the Prior Art

The liquid crystal display (LCD) and the organic light emitting diode (OLED) display are mainstream display technologies. The LCD utilizes liquid crystal molecules ability to rotate the polarization direction of light and together with a light source to display images. For example, an environment light source or a backlight behind a liquid crystal panel of the LCD, to illuminate the liquid crystal panel. On the contrary, the OLED display employs a self-illuminating LED panel for a display panel without a backlight, and advantages of the OLED display are high power saving efficiency, a wide viewing angle, high color contrast and so on. However, because of higher cost, the OLED display is less popular than the LCD.

For the backlight of the LCD, an LED backlight is obviously better than a cold cathode fluorescent lamps backlight in many aspects including color contrast, volume reduction and power saving efficiency. Currently, the main technology of the LED backlight panel is the direct LED backlight panel using RGB LEDs or white LEDs, which installs arrayed LEDs behind the liquid crystal panel to support the local dimming function and achieve power saving or light contrast enhancement.

To support a high resolution image, the LCD on portable electronic devices such as computers, cell phones and cameras trends toward a large dimension and a widescreen. However, the common method of data display mostly keeps a display ratio of 4:3. For the LCD with a widescreen, if the LCD employs the direct RGB LED backlight panel or the direct white LED backlight panel and uses the method of data display keeping the display ratio of 4:3, backlight power consumption of edges of the LCD is wasted. Therefore, it requires improvements in the power saving method for the LCD with the LED backlight panel.

SUMMARY OF THE INVENTION

It is therefore an objective of the present invention to provide a display power saving method for an electronic system and related electronic system.

The present invention discloses a display power saving method for an electronic system that includes a display device with a light emitting diode panel. The display power saving method comprises detecting whether a pointing device exists in the electronic system, obtaining the location of a pointer controlled by the pointing device when detecting the pointing device existing in the electronic system, determining a display area of a screen of the display device according to the location of the pointer, recognizing whether a power management mode of the electronic system is a power saving mode, and decreasing the brightness of an area of the screen other than the display area when recognizing that the power management mode is the power saving mode.

The present invention further discloses an electronic system with a display power saving function, which comprises a display device including a light emitting diode panel, a memory unit for storing data displayed on a screen of the display device, a processing unit coupled to the display device and the memory unit, and a display driving unit coupled to the light emitting diode panel and the processing unit, for generating a plurality of driving signals to drive the light emitting diode panel. The processing unit is utilized for detecting whether a pointing device exists in the electronic system, obtaining the location of a pointer controlled by the pointing device shown on the screen of the display device when the pointing device is detected, determining a display area of the screen of the display device according to the location of the pointer, recognizing whether a power management mode of the electronic system is a power saving mode, and generating a plurality of control signals for controlling the brightness of the light emitting diode panel to decrease the brightness of an area of the screen other than the display area when recognizing that the power management mode is the power saving mode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 illustrates a screen of a display device of an electronic system applying the process of FIG. 2.

DETAILED DESCRIPTION

Figure 1:
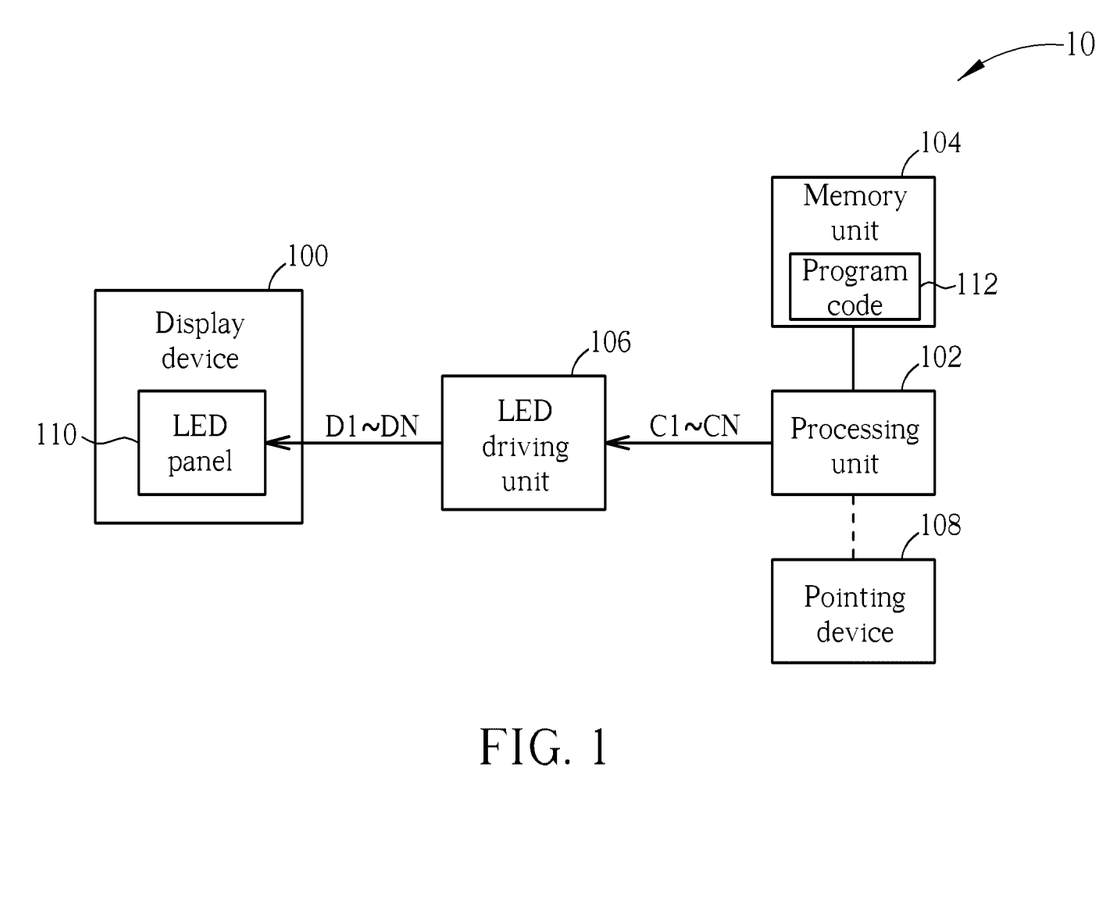
FIG. 1 is a schematic diagram of an electronic system according to an embodiment of the present invention.

Please refer to FIG. 1, which illustrates a schematic diagram of an electronic system 10 according to an embodiment of the present invention. The electronic system 10 is a system with a flat panel display and can be a desktop computer, laptop, cell phone, digital camera, television, and so on. The electronic system 10 includes a display device 100, a processing unit 102, a memory unit 104, and a light emitting diode (LED) driving unit 106. The display device 100 includes an LED panel 110 whose purpose depends on the type of the display device 100. For example, if the display device 100 is a liquid crystal display, the LED panel 110 is a backlight panel of the display device 100, which can be a direct RGB LED panel or a direct white LED panel. If the display device 100 is a self-illuminating display, e.g. an organic light emitting diode display, the LED panel 110 is exactly a display panel.

The LED panel 110 includes arrayed LEDs and can be divided into N LED sections to realize the local dimming control.

The processing unit 102 is coupled to the memory unit 104 and the LED driving unit 106, and is the core unit of the electronic system 10 for processing data and executing codes, e.g. a central processing unit (CPU) of a computer system. The processing unit 102 obtains location data of a section of the screen waiting for brightness adjustment by executing a program code 112 stored in the memory unit 104, generates control signals C1-CN for controlling the brightness of the LED panel 110, and outputs the control signals C1-CN to the LED driving unit 106. The LED driving unit 106 is coupled to the LED panel 110, and is utilized for generating driving signals D1-DN according to the control signals C1-CN to drive the LED panel 110. In practice, the driving signals D1-DN can be pulse width modulation signals to change the brightness of LEDs of the LED panel 110 by adjusting the duty cycle of the driving signals D1-DN, or can be current-controlled signals to change the brightness of the LEDs of the LED panel 110 by adjusting the operating current of the LEDs.

Please pay attention that the electronic system 10 may include or not include a pointing device 108, therefore, the dotted line in FIG. 1 is used to illustrate the relationship between the processing unit 102 and the pointing device 108. If the electronic system 10 is a laptop or desktop computer, the pointing device 108 can be a keyboard, a mouse, a trackball, a touch pad, or any similar device. If the electronic system 10 is a cell phone, the pointing device 108 can be a keyboard or a touch panel. In opposition, if the electronic system 10 is a television, the pointing device 108 may not be included.

Figure 2:
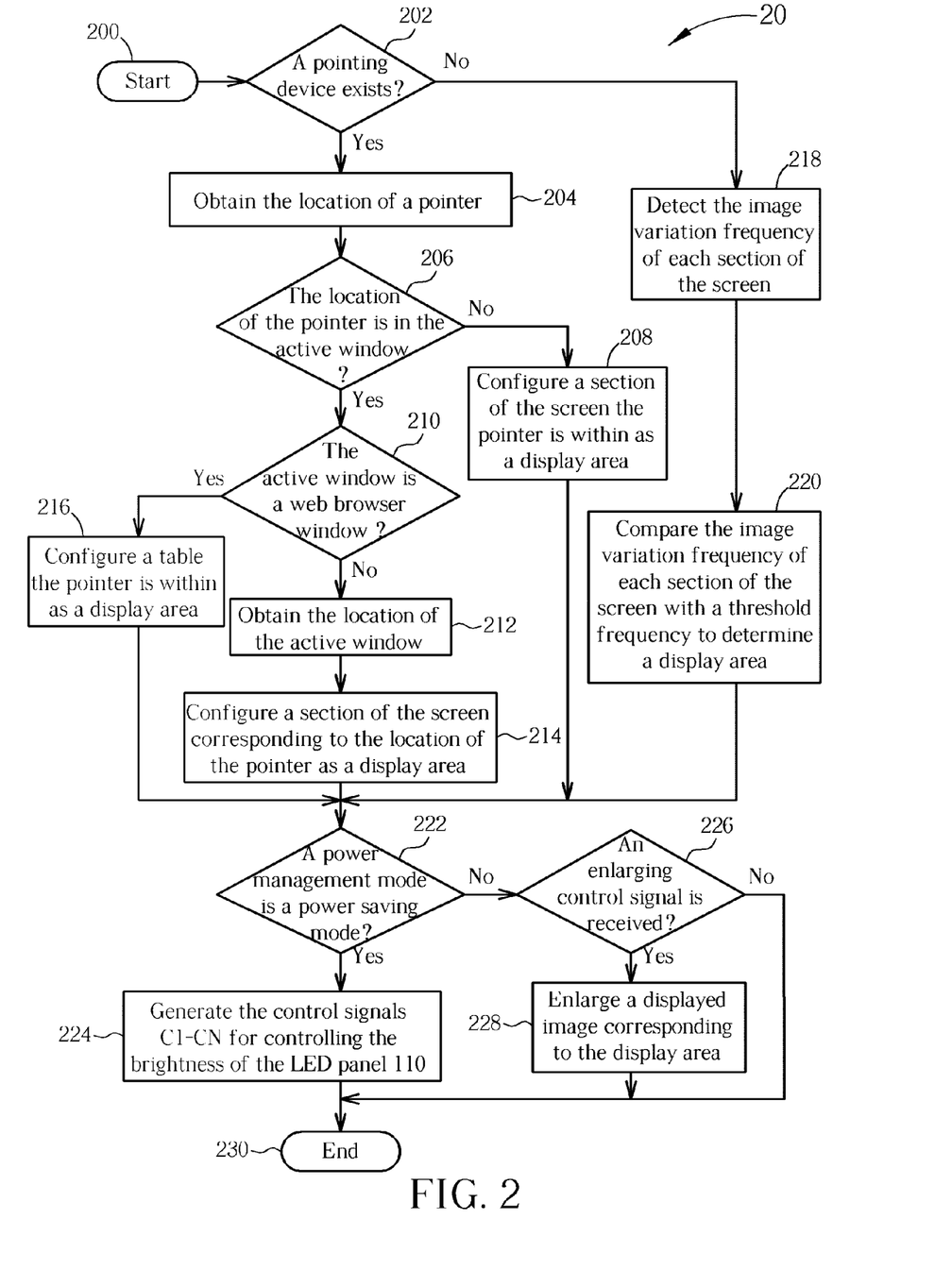
FIG. 2 is a flowchart of a process according to an embodiment of the present invention.

Please refer to FIG. 2, which illustrates a flowchart of a process 20 according to an embodiment of the present invention. The process 20 can be compiled into the program code 112 executed by the processing unit 102, for adjusting the brightness of the LED panel 110 to reduce the power consumption of the LED panel 110. The process 20 includes the following steps:

Step 200: Start.

Step 202: Detect whether a pointing device exists in the electronic system 10. If yes, perform the step 204; otherwise, perform the step 218.

Step 204: Obtain the location of a pointer controlled by the pointing device.

Step 206: Determine whether the location of the pointer is in the active window. If yes, perform the step 210; otherwise, perform the step 208.

Step 208: Configure a section of the screen that the pointer is within as a display area.

Step 210: Determine whether the active window is a web browser window. If yes, perform the step 216; otherwise, perform the step 212.

Step 212: Obtain the location of the active window.

Step 214: Configure a section of the screen corresponding to the location of the pointer as a display area.

Step 216: Configure a table that the pointer is within as a display area.

Step 218: Detect the image variation frequency of each section of the screen of the display device 100.

Step 220: Compare the image variation frequency of each section of the screen with a threshold frequency to determine a display area.

Step 222: Determine whether a power management mode of the electronic system 10 is a power saving mode. If yes, perform the step 224; otherwise, perform the step 226.

Step 224: Generate the control signals C1-CN for controlling the brightness of the LED panel 110.

Step 226: Detect whether an enlarging control signal is received. If yes, perform the step 228; otherwise, perform the step 230.

Step 228: Enlarge a displayed image corresponding to the display area.

Step 230: End.

The process 20 is divided into 2 stages. The first stage includes the step 200 to the step 220 and the second stage includes the step 222 to the step 230. In the first stage, the processing unit 102 determines the display area of the screen of the display device 100 according to whether the pointing device 108 exists and other conditions. The brightness of other sections of the screen outside the display area can be decreased. In the second stage, the processing unit 102 generates the control signals C1-CN (by which the LED driving unit 106 generates the driving signals D1-DN accordingly to drive the LED panel 110) according to the determined display area when the power management mode of the electronic system 10 is the power saving mode, or enlarges a display image corresponding to the display area when the power management mode is not the power saving mode.

The process 20 is described in details as following. According to the step 202, the processing unit 102 detects whether the pointing device 108 exists in the electronic system 10. When the pointing device 108 is detected by the processing unit 102, the processing unit 102 obtains the location of a pointer controlled by the pointing device 108 according to the step 204. The pointer controlled by the pointing device 108, for example, the pointer controlled by a mouse may be shown on the display device 100 with the graphic format. The pointer controlled by the pointing device 108, for example, controlled by fingers or a stylus may be a moving point usually not shown on the display device 100. After obtaining the location of the pointer, the processing unit 102 determines whether or not the location of the pointer is in an active window according to the step 206. The type of the active window is not limited and it can be a folder window or an application window such as a text editing window, a video/image displaying window, a web browser window, and so on.

When the processing unit 102 determines that the location of the pointer is not in the active window, which implies that the user of the electronic system 10 may not active any window or may active a window but not perform any task on the active window, the processing unit 102 configures the section of the screen that the pointer is within as the display area according to the step 208. In this situation, the display area is a small area around the pointer, and the range of the display area determined by the step 208 can be a predetermined constant value of the electronic system 10 or can also be increased or decreased by the pointing device 108. In practice, the mouse or the touch panel accompanying with the keyboard can be utilized to increase/decrease the display area.

After determining the display area according to the step 208, the processing unit 102 determines whether the current power management mode of the electronic system 10 is a power saving mode according to the step 222. If the power management mode is the power saving mode, according to the step 224, the processing unit 102 generates the control signals C1-CN for controlling the brightness of the LED panel 110 according to the determined display area. Afterwards, the processing unit 102 outputs the control signals C1-CN to the LED driving unit 106 to drive the LED panel 110. Please note that, the control signals C1-CN are utilized to control corresponding N LED sections of the LED panel 110, each LED section formed by arrayed LEDs. If the display area is corresponding to M LED sections, M of the N control signals C1-CN are utilized for remaining the brightness of the corresponding M LED sections and (N-M) of the N control signals C1-CN are utilized for decreasing the brightness of corresponding (N-M) LED sections to reduce the power consumption of the LED panel 110. The brightness adjustment should follow the principle that the user can still distinguish content of the section of the screen.

Figure 3:
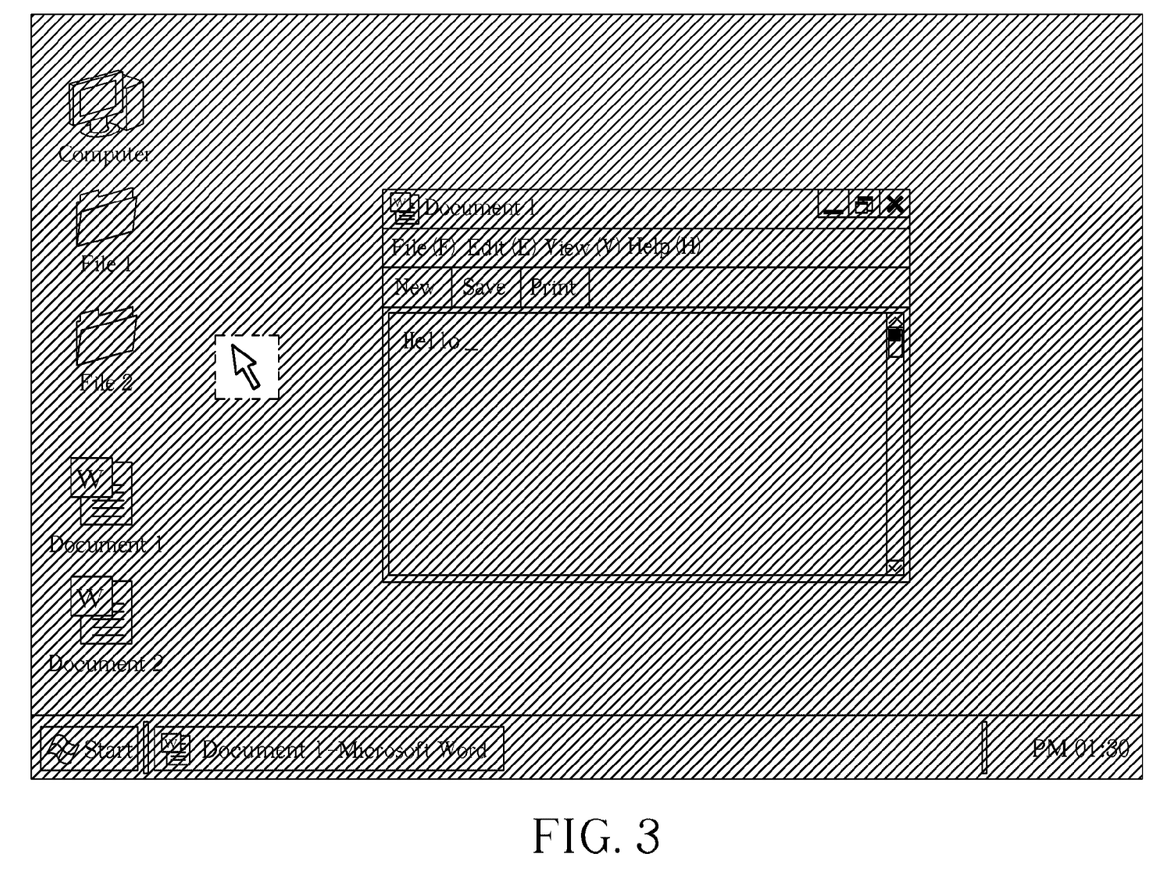
FIG. 3 is a diagram illustrating a screen of a display device of an electronic system applying the process of FIG. 2.
Figure 4A:
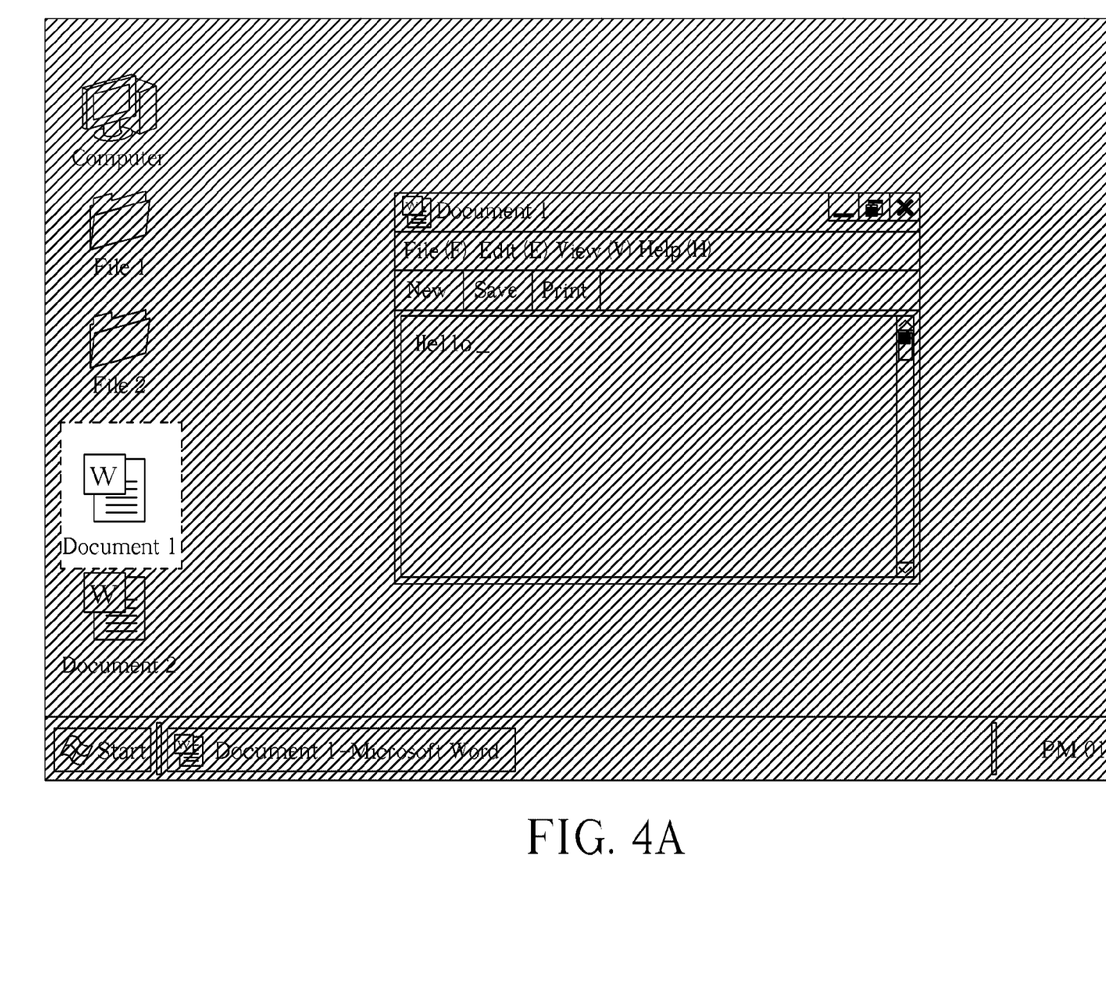
FIG. 4A and FIG. 4B illustrate a screen of a display device of an electronic system applying the process of FIG. 2.

Please refer to FIG. 3, which illustrates the screen of the display device 100 in the situation that the processing unit 102 detects the pointing device 108 and the electronic system 10 is in the power saving mode according to the process 20. As can be seen in FIG. 3, when the location of the pointer is outside the active window, the brightness of the display area around the pointer is not changed and the brightness of area other than the display area is decreased. Please refer to FIG. 4A and FIG. 4B, which illustrate the screen of the display device 100 in the situation that the processing unit 102 detects the pointing device 108 and the electronic system 10 is in the power saving mode according to the process 20. As can be seen, the display area is increased from a smaller range as in FIG. 4A to a larger range as in FIG. 4B, and the brightness of the display area is not changed and the brightness of area other than the display area is decreased. Therefore, the process 20 reduces substantially the power consumption of the LED panel 110 when the pointer is not in the active window.

Figure 4B:
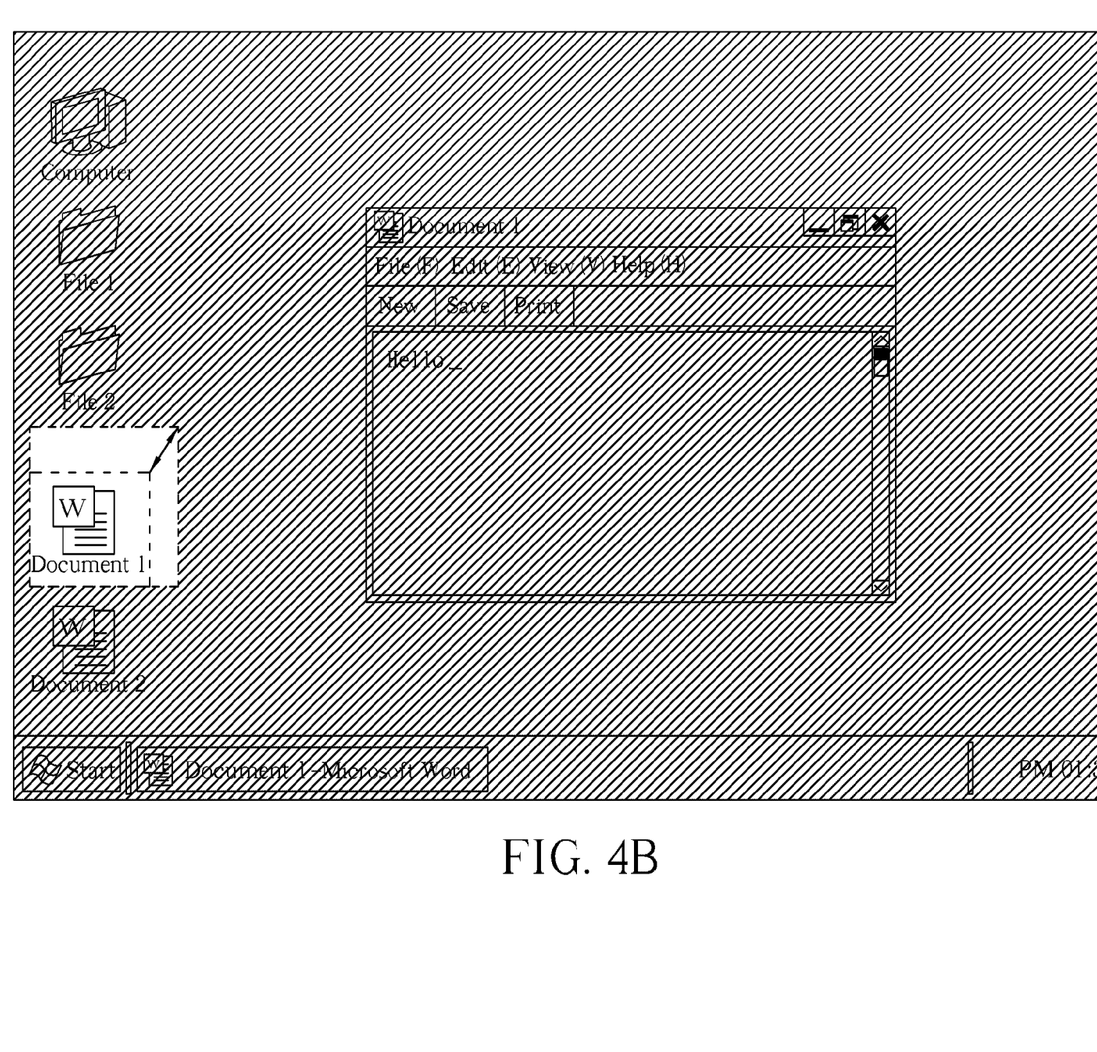

In addition, when the processing unit 102 determines that the current power management mode of the electronic system 10 is not the power saving mode, which implies that the electronic system 10 does not need to perform the power saving control of the LED panel 110, according to the step 226 and the step 228, the processing unit 102 detects whether an enlarging control signal is received and enlarges a displayed image corresponding to the display area (not increase the range of the display area as shown in FIG. 4B) when receiving the enlarging control signal. The enlarging control signal may be inputted by the user through an input device of the electronic system 10. When the processing unit 102 does not receive the enlarging control signal, the displayed image corresponding to the display area has not been enlarged. The image enlarging display techniques is well-known to those skilled in the art and is omitted herein.

When the processing unit 102 determines that the pointer is located in the active window, the processing unit 102 further determines whether the active window is a web browser window according to the step 210. When the active window is not a web browser window (and is another application window or folder window, for example), the processing unit 102 obtains the location of the active window and configures a section of the screen corresponding to the location of the pointer as the display area according to the step 212 and the step 214. The display area determined by the step 214 can be the whole active window, only a working area of the active window, or a control bar of the active window, e.g. a menu bar, a tool bar, a status bar, and so on. After the processing unit 102 determines the display area according to the step 214, the processing unit 102 determines whether the current power management mode of the electronic system 10 is the power saving mode according to the step 222, and then determines to perform the step 224 to generate the control signals C1-CN for controlling the brightness of the LED panel 110 or to perform the step 226 and the step 228 to enlarge the displayed image corresponding to the display area. Please refer to abovementioned descriptions of the step 226 and the step 228, which is omitted herein.

Figure 5:
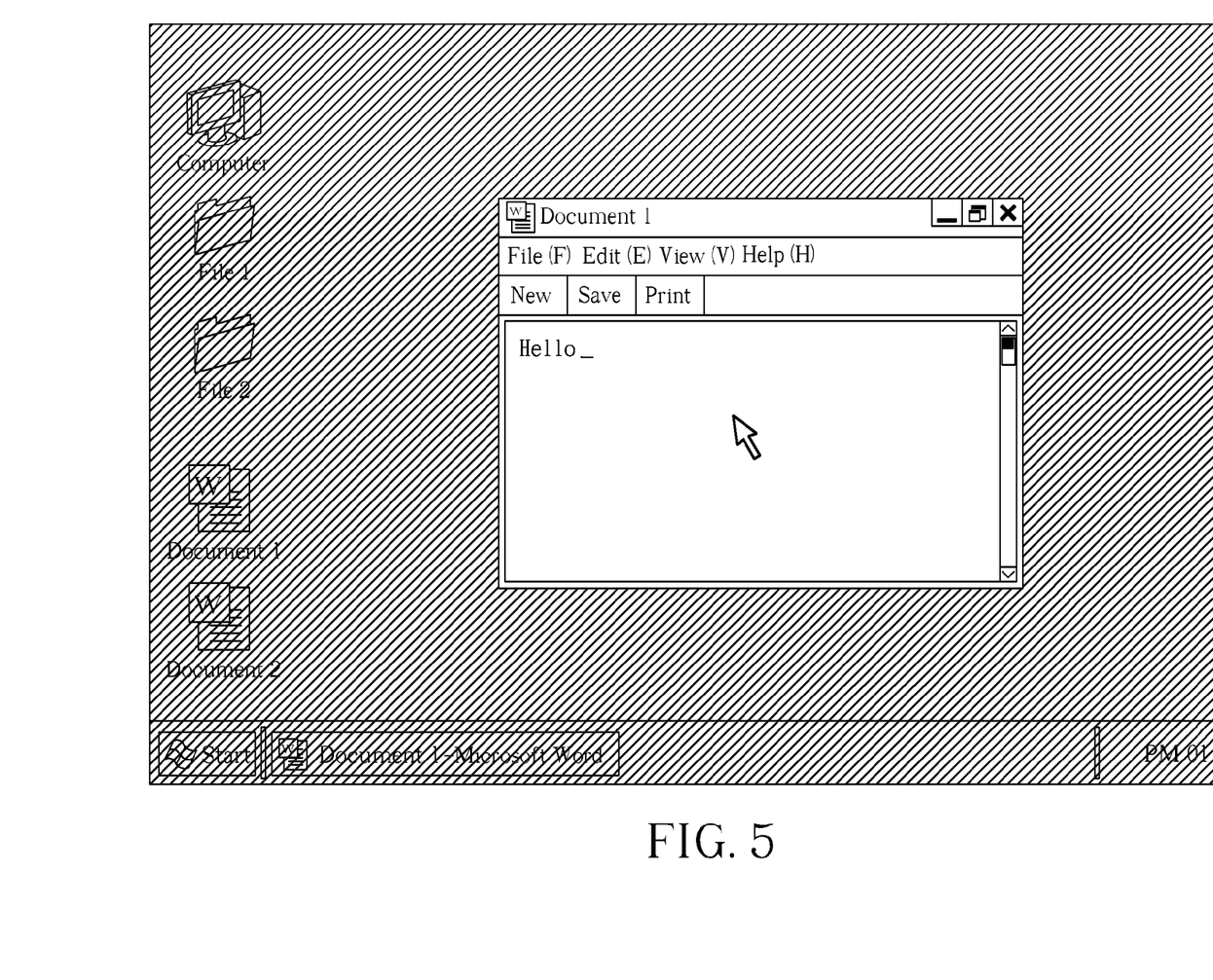
FIG. 5 illustrates a screen of a display device of an electronic system applying the process of FIG. 2.
Figure 6:
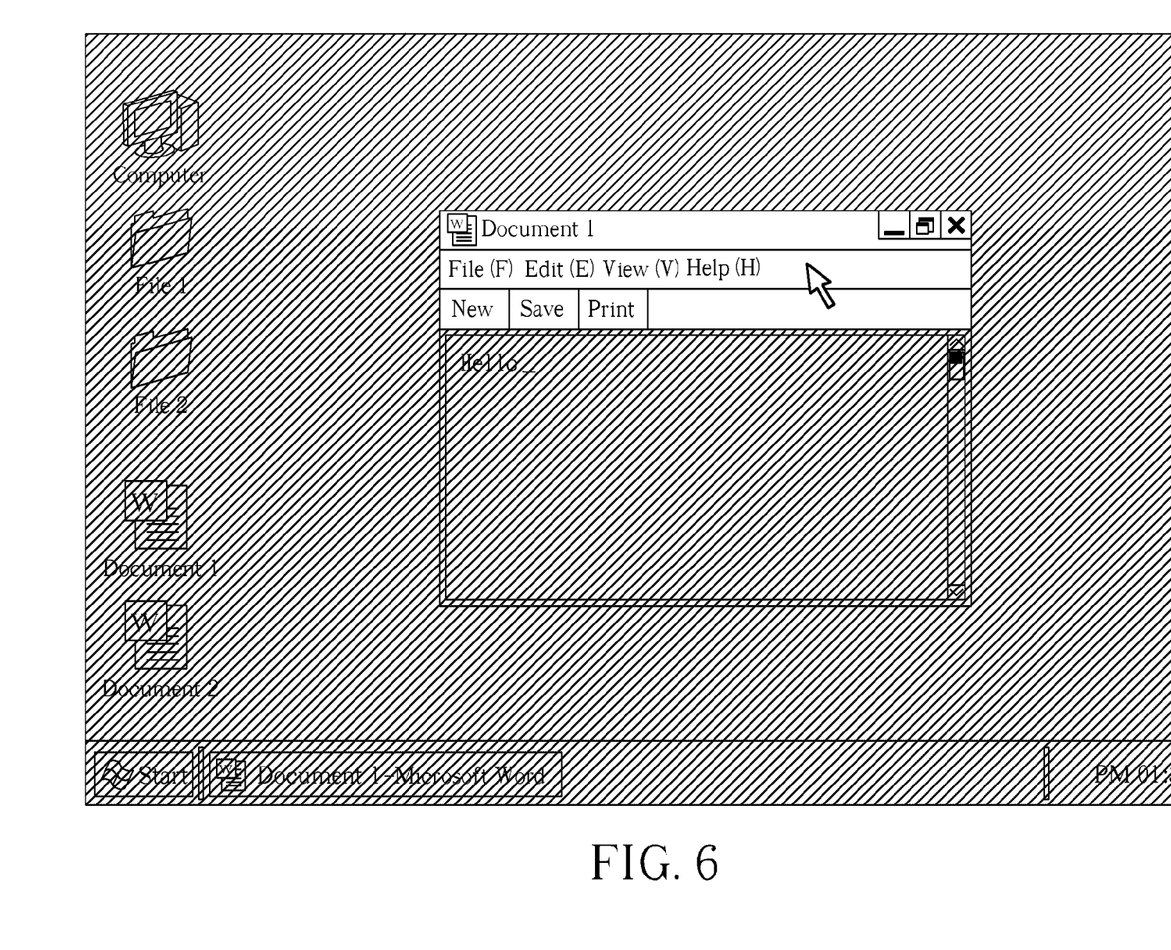
FIG. 6 illustrates a screen of a display device of an electronic system applying the process of FIG. 2.

Please refer to FIG. 5 and FIG. 6, which illustrate the screen of the display device 100 in the situation that the electronic system 10 is in the power saving mode and the processing unit 102 detects the pointing device 108 according to the process 20. FIG. 5 describes that the brightness of sections of the screen corresponding to the whole active window that the pointer is in is not changed and the brightness of sections of the screen corresponding to the area except the active window is decreased. FIG. 6 describes that only the brightness of sections of the screen corresponding to the working area of the active window is not changed and the brightness of sections of the screen other than the working area, e.g. a title bar, a tool bar, or a status bar is decreased.

In other embodiments of the present invention, the step 212 and the step 214 can be replaced by other steps, such as to configure a section of the screen with the image variation frequency higher than a threshold frequency as the display area, which means that the displayed image corresponding to this section varies more frequently than displayed images corresponding to other sections. Therefore, when the user moves the scroll bar of the active window up and down to browse continuous pages of different contents, the processing unit 102 decides the section of the screen needed to be configured as the display area according to the image variation frequency. Please refer to FIG. 7, which illustrates the section of the screen of the display device 100 in the situation that the electronic system 10 is in the power saving mode and the processing unit 102 detects the pointing device 108 according to the process 20. FIG. 7 describes a document window, in which only the brightness of the section of the screen with the higher image variation frequency is not changed, and the brightness of sections of the screen with the image variation frequency lower than the threshold frequency, e.g. a title bar, a tool bar, a status bar and blank sections in the working area, is decreased. Hence, the process 20 reduces substantially the power consumption for displaying information.

Figure 8:
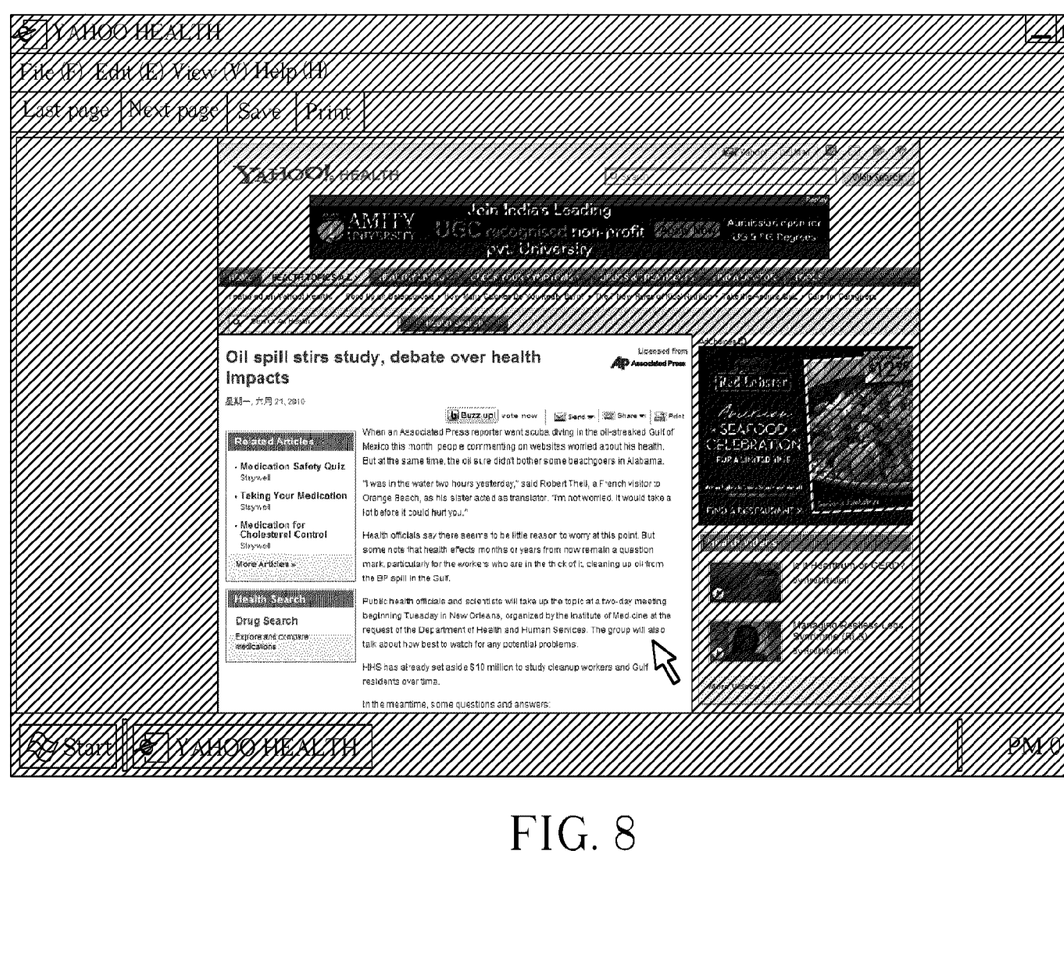
FIG. 8 illustrates a screen of a display device of an electronic system applying the process of FIG. 2.

According to the step 210, the processing unit 102 determines whether the active window is the web browser window. When the active window is the web browser window, the processing unit 102 configures a table of the web browser window that the pointer is within as the display area according to the step 216. After determining the display area, the processing unit 102 performs the step 222 to determine whether the current power management mode of the electronic system 10 is the power saving mode and thereby performs following steps for decreasing the brightness. Please refer to FIG. 8, which illustrates the screen of the display device 100 in the situation that the electronic system 10 is in the power saving mode and the processing unit 102 detects the pointing device 108 according to the process 20. FIG. 8 describes that only the brightness of the table which the pointer is within is not changed, and the brightness of sections of the screen other than the table is decreased. By the process 20, the user of the electronic system 10 can focus on the current reading table and at the same time, the power consumption of the LED panel 110 is reduced.

In other embodiments of the present invention, the step 216 can be replaced by other step such as to compare the image variation frequency of each section of the screen with a threshold frequency to determine the display area. For example, the processing unit 102 configures the table with the image variation frequency lower than a threshold frequency as the display area, or configures inversely the table with the image variation frequency higher than a threshold frequency as the display area.

Figure 9:
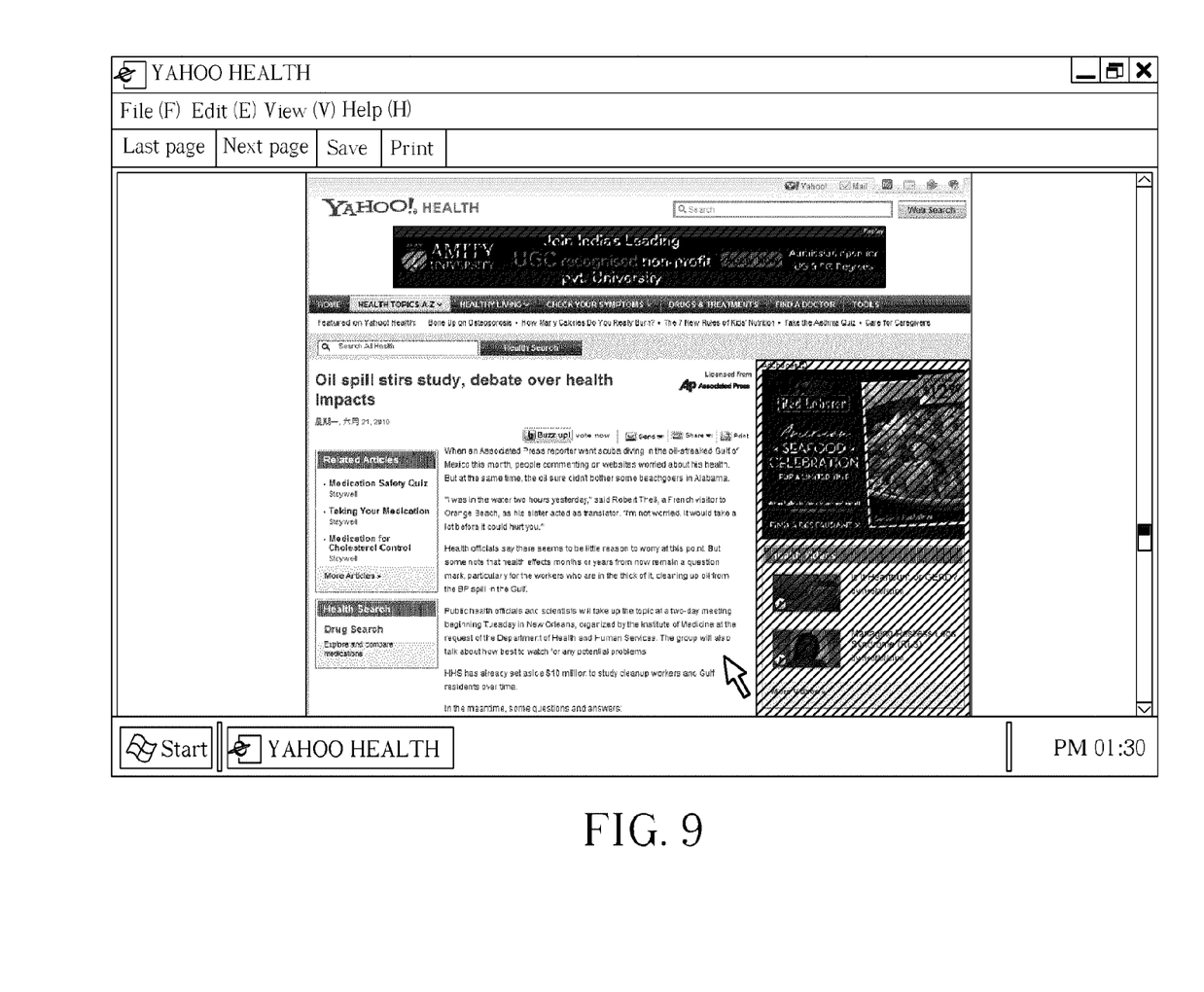
FIG. 9 illustrates a screen of a display device of an electronic system applying the process of FIG. 2.

Please refer to FIG. 9, which illustrates the screen of the display device 100 in the situation that the electronic system 10 is in the power saving mode and the processing unit 102 detects the pointing device 108 according to the process 20. FIG. 9 describes only the brightness of the section of the screen with the image variation frequency lower than a threshold frequency is not changed and the brightness of other sections of the screen with the image variation frequency higher than a threshold frequency, e.g. the frequently updating advertisement table, is decreased. From the above, the process 20 reduces the interference caused by the advertisement information when browsing websites and reduces the power consumption of the LED panel 110 at the same time. On the other side, when the user of the electronic system 10 wants to browse the section of the screen with higher image variation frequency, e.g. pop-up social network service messages, web videos and so on, the table with image variation frequency higher than the threshold frequency is configured as the display area.

Figure 10:
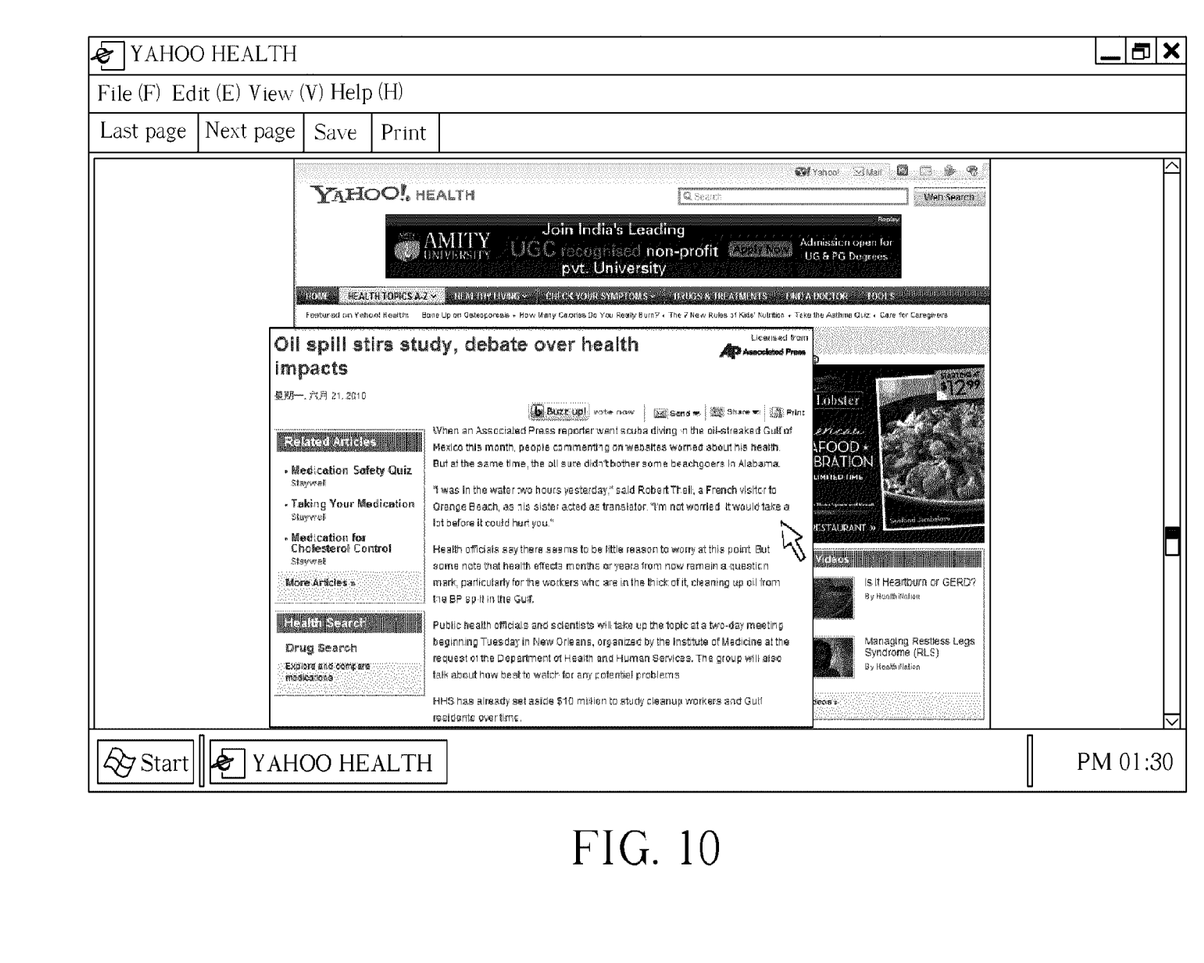
FIG. 10 illustrates a screen of a display device of an electronic system applying the process of FIG. 2.

In addition, please refer to FIG. 10, which illustrates the screen of the display device 100 in the situation that the electronic system 10 is not in the power saving mode and the processing unit 102 detects the pointing device 108 according to the process 20. As shown in FIG. 10, the display area in the web browser window is the table that the pointer is within and the displayed image corresponding to the table is enlarged.

Abovementioned step 204 to step 216 are steps for determining the display area by the processing unit 102 when the pointing device 108 exists in the electronic system 10. For the electronic system 10 without any pointing device, displayed images shown on the screen of display device 100 is usually dynamic images. Therefore, in the process 20, when the processing unit 102 knows that the pointing device 108 does not exist in the electronic system 10, the processing unit 102 measures the image variation frequency of each section of the screen in the display device 100 according to the step 218 and compares the image variation frequency of each section of the screen with a threshold frequency to determine the display area according to the step 220. For example, the processing unit 102 configures the section with the image variation frequency higher than threshold frequency as the display area, or inversely, configures the section with the image variation frequency lower than threshold frequency as the display area. After the display area is determined, the processing unit 102 performs the step 222 to the step 228. When the electronic system 10 is in the power saving mode, the processing unit 102 generates the control signals C1-CN for controlling the brightness of the LED panel 110 and outputs the control signals C1-CN to the LED driving unit 106 to drive the LED panel 110.

In short, the step 200 to the step 220 of the process 20 are the stage for determining the display area, and it can be regarded as the combination of four sub-processes for determining the display area under different conditions. In other words, the brightness of the section of the screen is decreased by different conditions. As in FIG. 2, the first sub-process includes the step 202, the step 204, the step 206 and the step 208 for determining the small display area when the pointer is not located in the active window; the second sub-process includes the step 202, the step 204, the step 206, the step 210, the step 212 and the step 214 for determining the display area when the pointer is located in the active window; the third sub-process includes the step 202, the step 204, the step 206, the step 210, and the step 216 for determining the display area when the pointer is located in the web browser window; the fourth sub-process includes the step 202, the step 218 and the step 220 for determining the display area by the image variation frequency when the electronic system 10 does not include the pointing device 108.

Please pay attention that the process 20 is one of the embodiments and those skilled in the art can make alterations and modifications accordingly. The processing unit 102 of the electronic system 10 can perform any one abovementioned sub-process independently to determine the display area or choose to perform any two or three sub-processes. When abovementioned sub-processes for determining the display area are utilized independently, some steps can be omitted or merged partially. For example, when the processing unit 102 only wants to determine the display area in the active window regardless of whether the active window is the web browser window, the processing unit 102 omits the step 210. Or, when the processing unit 102 only wants to adjust the display of the web browser window, the processing unit 102 merges the step 206 and the step 210 after the step 204 is performed, to determine directly whether the pointer is located in the web browser window.

In conclusion, via the process 20, no matter whether the electronic system has the pointing device, the brightness of the LED panel of the display device of the electronic system is decreased partially. The present invention is helpful to reduce the power consumption of the LED panel and to filter less important display information out, to raise the readability.

Those skilled in the art will readily observe that numerous modifications and alterations of the device and method may be made while retaining the teachings of the invention.

What is claimed is:

1. A display power saving method for an electronic system that includes a display device including a light emitting diode panel, the display power saving method comprising:
   detecting whether a pointing device exists in the electronic system to generate a detecting result;
   utilizing a first determination process to determine a display area of a screen of the display device according to the detecting result indicating that the pointing device exists in the electronic system, and utilizing a second determination process to determine the display area according to the detecting result indicating that the pointing device does not exist in the electronic system;
   recognizing whether a power management mode of the electronic system is a power saving mode; and
   decreasing the brightness of an area of the screen other than the display area when recognizing that the power management mode is the power saving mode;
   wherein the first determination process comprises obtaining a location of a pointer controlled by the pointing device and determining the display area according to the location of the pointer, and the second determination process comprises measuring an image content updating frequency of each section of the screen and comparing the image content updating frequency of each section of the screen with a threshold frequency for determining the display area.

2. The display power saving method of claim 1 further comprising:
   detecting whether an enlarging control signal is received when determining that the power management mode of the electronic system is not the power saving mode; and
   enlarging a displayed image corresponding to the display area when the enlarging control signal is received.

3. The display power saving method of claim 1, wherein the step of determining the display area according to the location of the pointer comprises:
   determining whether the location of the pointer is in an active window;

obtaining the position of the active window when the pointer is located in the active window; and configuring a section of the screen corresponding to the location of the pointer as the display area.

4. The display power saving method of claim 3, wherein the section of the screen is the active window, a working area of the active window, or a control bar of the active window.

5. The display power saving method of claim 1, wherein the step of determining the display area according to the location of the pointer comprises:

determining whether the location of the pointer is in an active window; and configuring a section of the screen with an image variation frequency higher than a threshold frequency as the display area when determining that the location of the pointer is located in the active window.

6. The display power saving method of claim 1, wherein the step of determining the display area according to the location of the pointer comprises:

determining whether the location of the pointer is in an active window; and configuring a table that the pointer is within as the display area when the pointer is located in the active window and the active window is a web browser window.

7. The display power saving method of claim 1, wherein the step of determining the display area according to the location of the pointer comprises:

determining whether the location of the pointer is in an active window; and configuring a table in the active window with an image variation frequency lower than a threshold frequency as the display area when the pointer is located in the active window and the active window is a web browser window.

8. The display power saving method of claim 1, wherein the step of determining the display area according to the location of the pointer comprises:

determining whether the location of the pointer is in an active window; and configuring a table in the active window with an image variation frequency higher than a threshold frequency as the display area when the pointer is located in the active window and the active window is a web browser window.

9. The display power saving method of claim 1, wherein the step of determining the display area according to the location of the pointer comprises:

determining whether the location of the pointer is in an active window; and configuring a section of the screen that the pointer is within as the display area when the pointer is not located in any active window.

10. The display power saving method of claim 1, wherein the step of comparing the image content updating frequency of each section of the screen with the threshold frequency for determining the display area comprises:

configuring at least one section of the screen with an image content updating frequency higher than the threshold frequency as the display area.

11. The display power saving method of claim 1, wherein the step of comparing the image content updating frequency of each section of the screen with the threshold frequency for determining the display area comprises:

configuring at least one section of the screen with an image content updating frequency lower than the threshold frequency as the display area.

12. An electronic system with a display power saving function comprising:

a display device including a light emitting diode panel;

a memory unit for storing data displayed on a screen of the display device;

a processing unit coupled to the display device and the memory unit, utilized for:

detecting whether a pointing device exists in the electronic system to generate a detecting result;

utilizing a first determination process to determine a display area of a screen of the display device according to the detecting result indicating that the pointing device exists in the electronic system, and utilizing a second determination process to determine the display area according to the detecting result indicating that the pointing device does not exist in the electronic system;

recognizing whether a power management mode of the electronic system is a power saving mode; and generating a plurality of control signals for controlling the brightness of the light emitting diode panel to decrease the brightness of an area of the screen other than the display area when recognizing that the power management mode is the power saving mode; and a display driving unit coupled to the light emitting diode panel and the processing unit, for generating a plurality of driving signals to drive the light emitting diode pane;

wherein the first determination process comprises obtaining a location of a pointer controlled by the pointing device and determining the display area according to the location of the pointer, and the second determination process comprises measuring an image content updating frequency of each section of the screen and comparing the image content updating frequency of each section of the screen with a threshold frequency for determining the display area.

13. The electronic system of claim 12, wherein the processing unit is further utilized for detecting whether an enlarging control signal is received when determining that the power management mode of the electronic system is not the power saving mode, and for enlarging a displayed image corresponding to the display area when the enlarging control signal is received.

14. The electronic system of claim 12, wherein the processing unit determines whether the location of the pointer is in an active window, obtains the position of the active window when the pointer is located in the active window, and configures a section of the screen corresponding to the location of the pointer as the display area.

15. The electronic system of claim 14, wherein the section of the screen is the active window, a working area of the active window, or a control bar of the active window.

16. The electronic system of claim 12, wherein the processing unit determines whether the location of the pointer is in an active window and configures a section of the screen with an image variation frequency higher than a threshold frequency as the display area.

17. The electronic system of claim 12, wherein the processing unit determines whether the location of the pointer is in an active window and configures a table that the pointer is within as the display area when the pointer is located in the active window and the active window is a web browser window.

18. The electronic system of claim 12, wherein the processing unit determines whether the location of the pointer is in an active window and configures a table in the active window with an image variation frequency lower than a threshold frequency as the display area when the pointer is located in the active window and the active window is a web browser window.

19. The electronic system of claim 12, wherein the processing unit determines whether the location of the pointer is in an active window and configures a table in the active window with an image variation frequency higher than a threshold frequency as the display area when the pointer is located in the active window and the active window is a web browser window.

20. The electronic system of claim 12, wherein the processing unit determines whether the location of the pointer is in an active window and configures a section of the screen that the pointer is within as the display area when the pointer does not exists on any active window.

21. The electronic system of claim 12, wherein the processing unit configures at least one section of the screen with an image content updating frequency higher than the threshold frequency as the display area.

22. The electronic system of claim 12, wherein the processing unit configures at least one section of the screen with an image content updating frequency lower than the threshold frequency as the display area.

* * * * *